(12) United States Patent
Lin

(10) Patent No.: US 6,791,576 B1
(45) Date of Patent: Sep. 14, 2004

(54) GAMMA CORRECTION USING DOUBLE MAPPING WITH RATIOMETRICALLY-RELATED SEGMENTS OF TWO DIFFERENT RATIOS

(75) Inventor: Tao Lin, Fremont, CA (US)

(73) Assignee: NeoMagic Corp., Santa Clara, CA (US)

( * ) Notice: Subject to any disclaimer, the term of this patent is extended or adjusted under 35 U.S.C. 154(b) by 0 days.

(21) Appl. No.: 09/511,013

(22) Filed: Feb. 23, 2000

(51) Int. Cl.[7] .................................................. G09G 5/00
(52) U.S. Cl. ....................... 345/690; 348/254; 348/674; 345/10; 345/20
(58) Field of Search ........................... 345/690, 600–605, 345/10–12, 20; 348/254, 674, 675

(56) References Cited

U.S. PATENT DOCUMENTS

| | | | |
|---|---|---|---|
| 4,438,495 A | 3/1984 | Collins et al. | 364/414 |
| 4,473,849 A | 9/1984 | Cool | 358/332 |
| 4,786,968 A | 11/1988 | Kutner | 358/164 |
| 5,196,924 A | 3/1993 | Lumelsky et al. | 358/32 |
| 5,243,426 A | 9/1993 | Murayama et al. | 358/164 |
| 5,282,036 A | 1/1994 | Worley, Jr. et al. | 358/164 |
| 5,408,267 A | 4/1995 | Main | 348/254 |
| 5,473,372 A | 12/1995 | Nobuoka et al. | 348/254 |
| 5,473,373 A | 12/1995 | Hwung et al. | 348/254 |
| 5,481,317 A | 1/1996 | Hieda | 348/674 |
| 5,537,071 A | 7/1996 | Jaspers | 327/346 |
| 5,706,058 A | 1/1998 | Okada | 348/674 |
| 5,764,216 A | 6/1998 | Tanaka et al. | 345/147 |
| 5,821,913 A | * 10/1998 | Mamiya | 345/88 |
| 6,020,921 A | 2/2000 | Aleksic et al. | 348/254 |

* cited by examiner

*Primary Examiner*—Lun-Yi Lao
(74) *Attorney, Agent, or Firm*—Stuart T. Auvinen

(57) ABSTRACT

Gamma correction or other power functions are generated for correcting the light intensity for digital pixels. Two levels of mapping of segments are preformed to reduce the total number of segments for a given precision. The range of inputs is divided into successively smaller segments. Each segment is smaller than the next by a factor of 1/a for a first or primary level, or 1/b for a second level of segments. All inputs are mapped or scaled up to the input range of the largest segment in the primary level. Then the largest primary segment is further divided into several second-level segments, and the input is again mapped or scaled into the largest of the second-level segments. Gamma correction is performed on the input scaled into the largest second-level segment. A linear approximation within the largest second-level segment is used. The result is de-mapped or scaled down from the largest second-level segment to the actual second-level segment, then it is scaled down from the largest primary-level segment to the actual primary-level segment for the original input. Smaller priority encoders and shifters and simplified de-mapping circuits can be used, saving logic.

20 Claims, 5 Drawing Sheets

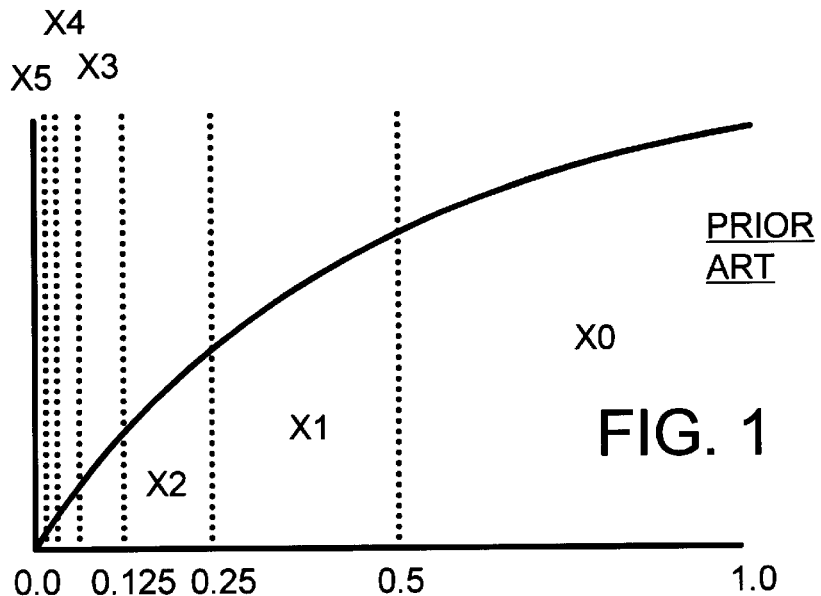
FIG. 1 PRIOR ART
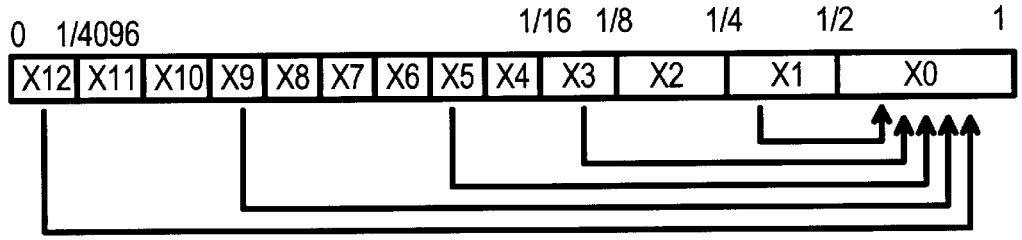
FIG. 2 PRIOR ART
| SEG. | PRI_ENC | RANGE |
|------|---------|-------|
| X0   | 0       | 1/2 - 1 |
| X1   | 1       | 1/4 - 1/2 |
| X2   | 2       | 1/8 - 1/4 |
| X3   | 3       | 1/16 - 1/8 |
| X4   | 4       | 1/32 - 1/16 |
| X5   | 5       | 1/64 - 1/32 |
| X6   | 6       | 1/128 - 1/64 |
| X7   | 7       | 1/256 - 1/128 |
| X8   | 8       | 1/512 - 1/256 |
| X9   | 9       | 1/1024 - 1/512 |
| X10  | A       | 1/2048 - 1/1024 |
| X11  | B       | 1/4096 - 1/2048 |
| X12  | C       | 0 - 1/4096 |
13 SEGMENTS
PRIOR ART
FIG. 3

7+2=9 SEGMENTS

| SEG. | PRI_ENC | RANGE |
|---|---|---|
| X0 | 0 | 1/4 - 1 |
| X1 | 1 | 1/16 - 1/4 |
| X2 | 2 | 1/64 - 1/16 |
| X3 | 3 | 1/256 - 1/64 |
| X4 | 4 | 1/1024 - 1/256 |
| X5 | 5 | 1/4096 - 1/1024 |
| X6 | 6 | 0 - 1/4096 |

| SEG. | PRI_ENC | RANGE |
|---|---|---|
| Y0 | 0 | 1/2 - 1 |
| Y1 | 1 | 1/4 - 1/2 |

| SEG. | PRI_ENC | RANGE |
|---|---|---|
| X0 | 0 | 1/16 - 1 |
| X1 | 1 | 1/256 - 1/16 |
| X2 | 2 | 1/4096 - 1/256 |
| X3 | 3 | 0 - 1/4096 |

4+4=8 SEGMENTS

| SEG. | PRI_ENC | RANGE |
|---|---|---|
| Y0 | 0 | 1/2 - 1 |
| Y1 | 1 | 1/4 - 1/2 |
| Y2 | 2 | 1/8 - 1/4 |
| Y3 | 3 | 1/16 - 1/8 |

GAMMA CORRECTION USING DOUBLE MAPPING WITH RATIOMETRICALLY-RELATED SEGMENTS OF TWO DIFFERENT RATIOS

FIELD OF THE INVENTION

This invention relates to graphics systems, and more particularly to gamma correction of pixels.

BACKGROUND OF THE INVENTION

Video displays using cathode-ray tubes (CRTs) are widely used. A voltage applied to the CRT determines the intensity or brightness of a pixel. As the applied voltage is increased, the pixel appears brighter as the CRT's light output increases. However, the relationship of the applied voltage to the light output is not a simple linear function. Instead, the light output is proportional to the applied voltage raised to a power of a constant gamma ($\gamma$):

$$L = v^\gamma$$

where v is the applied or driving voltage normalized between 0 and 1 and L is the light output. For television monitors, gamma $\gamma$ is typically between 2.2 to 2.8, while gamma is somewhat lower, between 1.4 and 2.2, for most computer monitors. Thus the light output is roughly the square of the normalized voltage.

A captured image, such as one captured by a sensors in a digital camera, may be corrected for this non-linear relationship of light and voltage. The red, green, and blue (R,G,B) components of a pixel may each be separately corrected. This correction uses a gamma-correction function that is complementary to the distortion function (above). The uncorrected captured pixel w is gamma-corrected to generate corrected pixel w' using the following equation:

$$w' = w^\alpha$$

where $\alpha$ is the reciprocal of gamma, $1/\gamma$.

Many methods for gamma correction are known, both using analog and using digital techniques. For computer and digital camera systems, digital techniques are preferred since they are easier to integrate with the other digital functions.

Power functions such as the gamma-correction function have a special kind of symmetry that can be used to simplify implementation of the function. This symmetry depends on ratios. FIG. 1 shows a graph of a gamma-correction function that is divided into segments that are ratios of each other.

The gamma function graph has an input shown on the x axis that is normalized to be between 0 and 1. The output of the function is the y value of the curve at any desired x value. The y value can be read from the y axis. The curve for a power function such as a gamma correction function has the general curved shape shown.

The function curve is divided into several segments X0, X1, X2 . . . X5. The largest segment X0 is on the right and covers input x values from 0.5 to 1. The next segment X1 is half the width of segment X0, having inputs from 0.25 to 0.5. The third segment X2 is even smaller in width, having inputs from 0.125 to 0.25. Each successive segment has one-half the width of the segment to its right. The last (leftmost) segment X5 spans the range of 0 to 1/64.

The segments are thus related to each other by a ratio relationship. The segments are ratio-metrically related. The gamma function is a self-similar function because the function curve is similar in each of the segments. The function curve within each segment can be approximated as a straight line so that the gamma correction function is approximated as a piece-wise-linear (PWL) function. A non-linear correction can also be added to the PWL function. See U.S. Pat. No. 5,408,267 Main and assigned to The 3DO Company of Redwood City, Calif.

Mapping to Largest (Standard) Segment

Rather than store the function curve for each of the segments, only the curve in the first (largest) segment X0 can be stored. This first segment X0 is known as the standard segment. When the input value is in one of the other segments, the input value is mapped (scaled up) to the range of the largest (standard) segment. Then the function curve of the standard segment is used to determine the y value. The y value is then de-mapped (scaled down) to the final output y that corresponds to the original (smaller) segment. This way only function values within the largest (standard) segment need to be stored or generated. The results from the largest segment are then scaled by the ratio of the segments raised to the power of $\alpha$.

FIG. 2 shows segments being mapped to the standard segment. In this example, the input value is encoded by 12 binary bits, so that the input can represent any value from 0 to 1 with a resolution of 1/4096. The largest segment X0 spans the range of inputs from 1/2 to 1. This is the standard segment. The next segment X2 spans inputs from 1/4 to 1/2, while the next segment X2 spans 1/8 to 1/4. Each successive segment spans half the width of inputs as the previous, until the smallest segment, X12, spans values from 0 to 1/4096, having only 2 values in the smallest segment.

When an input is in one the smaller segments X12 to X1, the input is scaled up to the input range of the standard segment X0 by a bit-shift. For example, to scale from segment X1 to X0, the input x is left-shifted by one bit-position, effectively multiplying by 2. To scale from segment X3 to X0, the input x is left-shifted by three bit-positions, effectively multiplying by $2^3$ or 8. Inputs in segment X3 are thus shifted from the range of 1/16 to 1/8 to the range of 1/2 to 1. Inputs in the last segment X12 are shifted by 12 bits, or multiplied by $2^{12}$ or 4096.

FIG. 3 is a table of segments in a prior-art gamma-correction function having 12 input bits. The 13 segments X0 to X12 have input ranges that double for each larger segment. For example, segment X5 has inputs in the range 1/64 to 1/32, which is double the width of the prior segment X6, which has inputs from 1/128 to 1/64.

The segment for any input x can be determined by a priority encoder. The priority encoder finds the bit-position of the leading one in the 12-bit input x. When the leading bit is a one, the priority encoder outputs a 0, indicating that the input is in the range of segment X0. When the priority encoder finds the leading one in the $6^{th}$ bit position from the left, it outputs a 5 to indicate that the input is in the input range for segment X5, 1/64 to 1/32.

Gamma Correction Using Segment Mapping—FIG. 4

FIG. 4 is a diagram of gamma correction using segment mapping. The input pixel component, either the R, G, or B value, is applied to priority encoder 12. The leading one is detected and encoded by priority encoder 12 as a shift value N. Signal N indicates the number of bit positions from the left that the first (leading) one is located at within input x.

Mapper 10 also receives the input x, and shifts x by the number N of bit positions from priority encoder 12. The value of N indicates which segment the input x is in, as shown in the table of FIG. 3. Shifting input x by this number of bits maps the input x to the range of the standard segment, producing shifted input y.

The shifted input y from mapper 10 is sent to gamma corrector 14. Gamma corrector 14 accepts inputs only in the range of the standard segment. Gamma corrector 14 performs a linear interpolation within the standard segment to produce a corrected value y'. The corrected value y' is a linear approximation of the gamma-correction curve within the standard segment. A non-linear correction may also be applied by gamma corrector 14.

Since the corrected value y' from gamma corrector 14 is for the function curve within the standard segment, it needs to be scaled down to the function value for the actual segment of input x. De-mapper 16 multiplies the corrected value y' from gamma corrector 14 by a pre-determined constant. This multiply scales the corrected value y' to the corrected value x' that corresponds to the input x.

While such segment-mapping gamma correction is useful, a large number of segments may be required for higher-precision graphics that use multi-bit pixels. For example, a 12-bit input x requires 13 segments to properly cover the entire input range with high precision. This requires the use of a 13-bit priority encoder and storage of 13 predefined constants for de-mapping. Such large priority encoders consume chip area and power. A smaller priority encoder is more desirable.

What is desired is a gamma corrector that uses segment mapping. It is desired to reduce the cost of the gamma correction system by reducing the amount of logic required for a large multi-bit priority encoder. The precision from a large number of segments is still desired, but with a lower logic burden. High precision while using a small priority encoder is desired. Multiplication by a reduced set of constants is desired to reduce constant storage. An efficient structure for a gamma correction apparatus using segment mapping is desired.

SUMMARY OF THE INVENTION

A multi-level segment-mapping function generator has an input with an input value within an input range. The input range is divided into a plurality of first-level segments of varying width including a standard first-level segment.

A first-level mapper receives the input value. It scales the input value to an intermediate input value within a range of the standard first-level segment. The first-level mapper outputs the intermediate input value to an intermediate input. The intermediate input value output by the first-level mapper is within a second input range equal to the range of the standard first-level segment. The range of the standard first-level segment is divided into a plurality of second-level segments of varying width. The plurality of second-level segments include a standard second-level segment.

A second-level mapper receives the intermediate input from the first-level mapper. It scales the intermediate input value to generate a final input value. The final input value is within a range of the standard second-level segment.

A function generator receives the final input from the second-level mapper. It generates a result of a pre-determined function from the final input value.

A second-level de-mapper receives the result from the function generator. It adjusts the result from the function generator to an intermediate result. The intermediate result is a result of the pre-determined function for the intermediate input value.

A first-level de-mapper receives the intermediate result from the second-level de-mapper. It adjusts the intermediate result from the second-level de-mapper to a final result. The final result is a result of the pre-determined function for the input value. Thus the final result can be generated for any input value within the input range using the function generator that generates results only within the standard second-level segment.

In further aspects the plurality of first-level segments are non-overlapping and ratio-metrically related where each smaller first-level segment is 1/a the input width of a next larger first-level segment. The constant a is a positive integer representing a first ratio. The standard first-level segment is a largest of the plurality of first-level segments.

The plurality of second-level segments are non-overlapping and ratio-metrically related where each smaller second-level segment is 1/b the input width of a next larger second-level segment, where b is a positive integer representing a second ratio. The standard second-level segment is a largest of the plurality of second-level segments. Thus segments are ratios of larger segments in a level.

In still further aspects the constant a is not equal to b. Each level has segments with different ratios of segment widths.

In further aspects of the invention the function generator is a linear interpolator generating the result by multiplying the final input by a slope of a line and adding a constant. Thus the function is approximated by a line within the standard second-level segment.

In further aspects the first-level mapper has a first priority encoder that receives the input. It detects a leading significant bit in multiple bits in the input that represent the input value. The first priority encoder generates a first shift signal determined by a location of the leading significant bit within the input value. A first shifter receives the input. It shifts the input value by a shift signal determined by the first shift signal to generate the intermediate input value. Thus the first-level mapper shifts the input value.

In other aspects the second-level mapper has a second priority encoder that receives the intermediate input. It detects a leading significant bit in multiple bits in the intermediate input that represent the intermediate input value. The second priority encoder generates a second shift signal determined by a location of the leading significant bit within the intermediate input value. A second shifter receives the intermediate input. It shifts the intermediate input value by a second shift signal determined by the second shift signal to generate the final input value. Thus the second-level mapper shifts the intermediate input value.

In still further aspects of the invention the first-level de-mapper has a reverse shifter that receives the intermediate result from the second-level de-mapper. It shifts the intermediate result by a number of bit-positions to generate the final result. The number of bit-positions is determined by the first shift signal from the first-level priority encoder. A full multiplier for multiplying the intermediate result by an arbitrary constant is not required. The reverse shifter shifts the intermediate result in an opposite direction to a direction that the first shifter shifts the input value.

In other aspects the second-level de-mapper has a constant multiplier that receives the result from the function generator. It multiplies the result by a constant to generate the intermediate result. The constant is a function of the second shift signal from the second priority encoder.

BRIEF DESCRIPTION OF THE DRAWINGS

FIG. 1 shows a graph of a gamma-correction function that is divided into segments that are ratios of each other.

FIG. 2 shows segments being mapped to the standard segment.

FIG. 3 is a table of segments in a prior-art gamma-correction function having 12 input bits.

DETAILED DESCRIPTION

The present invention relates to an improvement in gamma correction circuits. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that the amount of logic can be reduced for a segment-mapped gamma corrector by using two levels of mapping. Although it would seem that using 2 levels of mapping and de-mapping would increase hardware requirements, some choices for these levels can actually reduce hardware requirements.

Proper choices for nesting of segment mapping can reduced the priority encoding necessary while maintaining high precision. For example, precision of 13 segments can be achieved using two levels of mapping each with 4 segments per level. Two 4-bit priority encoders are needed rather than one larger 13-bit priority encoder. The amount of logic is reduced by at least 50%.

Figure 5:
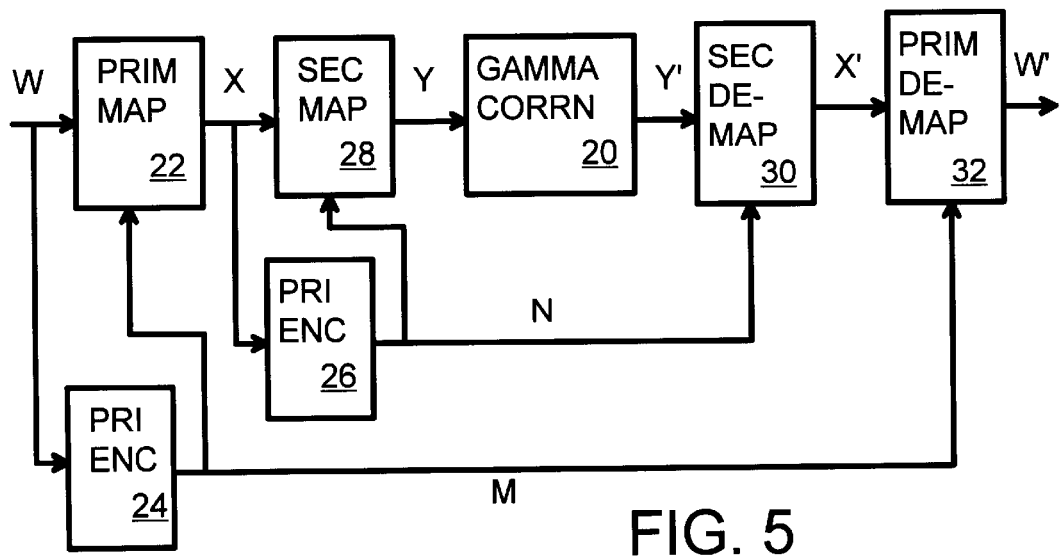
FIG. 5 is a diagram of a gamma correction system using dual levels of mapping.

Dual-Level Mapping—FIG. 5

FIG. 5 is a diagram of a gamma correction system using dual levels of mapping. Input W is a multi-bit value that is normalized between 0 and 1. In a preferred embodiment, W is a pixel value such as a Y luminance value of a YUV pixel. Primary-level priority encoder 24 finds the leading one in W and encodes its position as primary-level shift signal M. Primary-level mapper 22 receives the input W and shifts it a number of bit-positions determined by shift signal M. The encoding of shift signal M may be more complex than simply a binary number of bit positions.

Primary-level mapper 22 shifts the input W by an amount indicated by primary-level priority encoder 24 to produce intermediate input X. Second priority encoder 26 and second mapper 28 each receive intermediate input X. Second priority encoder 26 determines the location of the leading one in intermediate input X and generates second-level shift signal N. Second-level shift signal N is applied to second mapper 28 to determine the number of bit positions that second mapper 28 shifts intermediate input X to generate final input Y.

Final input Y is in the range of a standard segment that is operated on by gamma corrector 20. The gamma-correction function within this standard segment is approximated by a line segment by gamma corrector 20. Gamma corrector 20 approximates the gamma-corrected function for final input Y to generate corrected output Y'. A non-linear correction may also be applied by gamma corrector 20.

Two levels of de-mapping are needed to convert corrected output Y' to the final output W' that is the gamma-corrected value for input W. Second-level de-mapper 30 converts corrected output Y' to intermediate output X'. The second-level shift signal N determines a constant that is multiplied by Y' to generate X'. Intermediate output X' is the gamma-corrected value for intermediate input X.

Primary-level de-mapper 32 receives intermediate output X' from second-level de-mapper and performs another de-mapping or scaling of the output. The primary-level shift signal M determines the amount of scaling that needs to be applied to intermediate output X' to generate final output W'. Final output W' is the gamma-corrected value for input W.

Two levels of segment mapping are performed. Input W and final output W' correspond to the x and y value of the gamma function in a smallest segment. Intermediate input X and intermediate output X' correspond to x and y values of the gamma function in an intermediate segment that is larger (wider) than the smallest segment, but smaller than the standard segment. Final input Y and corrected output Y' correspond to the x and y value of the gamma function within the standard segment.

Figures 6A, 6B, 7A, 7B:
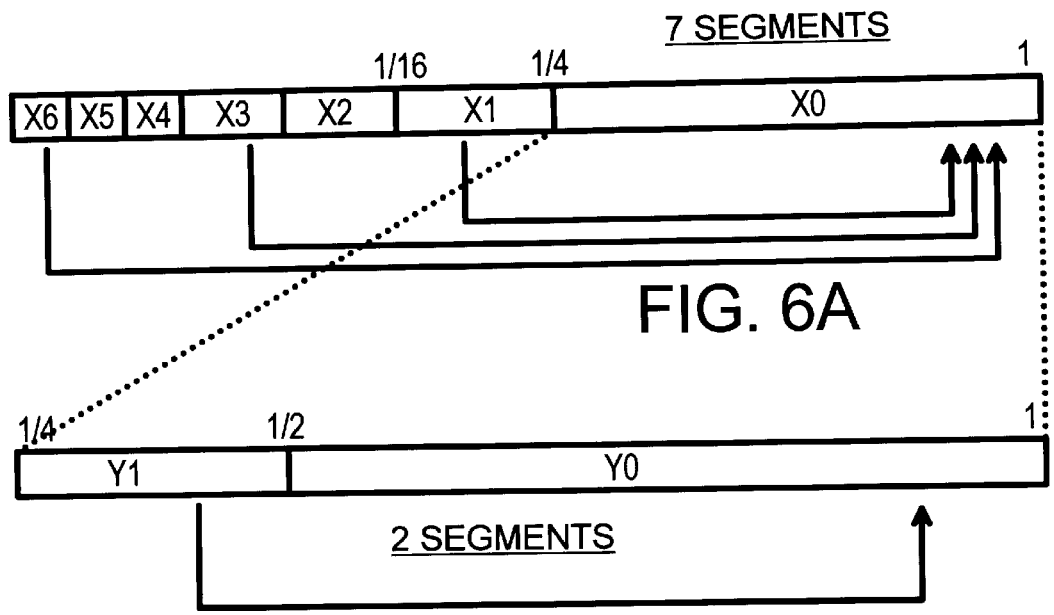
FIGS. 6A, 6B highlight two levels of segment mappings for a gamma-correction function.
FIGS. 7A, 7B are tables of the primary-level and second-level segments.

2 Levels of Segments—FIGS. 6A, B

FIGS. 6A, 6B highlight two levels of segment mappings for a gamma-correction function. In FIG. 6A, the primary mapping divides the full normalized input range of 0 to 1.0 into 7 primary segments. These primary segments are ratiometrically related. The primary standard segment X0 is the largest segment, while successive segments X1 to X6 are each one-quarter the width of the prior segment. For example, primary standard segment X0 includes input value from 1/4 to 1, a width of 3/4, while next segment X1 includes inputs from 1/16 to 1/4, a width of 3/16. The following segment X2 ranges from 1/64 to 1/16, a width of only 3/64. The smallest segment X6 is from 0 to 1/4096.

Any input in the lower primary segments X1 to X6 are mapped to primary standard segment X0 by the primary-level of mapping. The intermediate input X is within the range of primary standard segment X0, from 1/4 to 1. These values are sent to the second-level mapper.

FIG. 6B shows the secondary-level segments. The intermediate input X values are within the input range of the primary standard segment, from 1/4 to 1. This primary standard segment is further divided into 2 segments by the second-level mapping. In the second-level of mapping, each successive segment is one-half the width of the previous segment. Standard segment Y0 has intermediate inputs from 1/2 to 1, while smaller segment Y1 has inputs from 1/4 to 1/2. Since primary standard segment X0 ends at 1/4, additional second-level segments are not needed as the intermediate input value X cannot be less than 1/4.

Any input in smaller segment Y1 is mapped into standard segment Y0 by the second mapper. Standard segment Y0 is the segment that is gamma corrected to produce corrected output Y'.

FIG. 7A is a table of the primary-level segments. A total of 7 primary segments X0 to X6 are mapped for a 12-bit input W. The primary-level encoder encodes these segments by finding the leading one in input W. The ranges of each primary segment as shown in the table.

FIG. 7B is a table of the second-level segments. Only two segments are in the second level, segments Y0 and Y1. The second-level priority encoder can be quite simple as only 2 possible segments are mapped.

Seven segments are mapped by the primary level and two more segments for the second level. This is a total of 7+2 or 9 segments. A 7-level priority encoder is used in the primary level while a 2-level priority encoder is used in the second level. Note that the precision of the primary level is 1/4096, the range of the smallest segment. This same precision required a 13-level priority encoder in the prior art of FIGS. 2, 3. A reduction in logic from 13 levels to 7 levels is achieved.

Implementation of Mapping/De-Mapping

Each of the segments in a level are ratio-metrically related to other segments in that level. In this example, for the primary level, each successive segment is one-quarter the width of the next segment. The length in x of segment i is related to the next segment i−1 by the equation:

$$L(i)=a*L(i-1)$$

where a is a ratio constant (4 in this example).

Likewise the segment lengths for the second level of segments are related to each other by the equation:

$$L(j)=b*L(j-1)$$

where b is a ratio constant (2 in this example). The primary and second level segment-ratio constants are always different. The ratios a, b are selected so that primary de-mapping can be accomplished by a shift rather than a full multiply.

In the above example, the value of gamma did not determine the segmentation. If the value of gamma is assumed to be 2.0, then alpha a is 0.5. The primary mapping follows the equation:

$$X=4^{m}*W$$

where m is a non-negative integer that identifies the primary segment. This value m can be the shift signal M from the primary priority encoder. This equation for the primary mapping can be implemented by a shifter that shifts by 0, 2, 4, 6, etc. bit positions.

The secondary mapping is:

$$Y=2^{n}*X$$

where n is a non-negative integer that identifies the secondary segment. This value n can be the second shift signal N from the second priority encoder. Since there are only 2 secondary segments in this example, n can be only 0 or 1. A simple shifter can implement the second mapper. The value X is either shifted by one bit or not shifted at all to generate Y.

The second de-mapper passes Y' through to X' when n=0. When n=1, the complement of the secondary mapping equation is used for de-mapping:

$$X'=0.5^{0.5}*Y'=0.7071*Y'$$

The second de-mapping can be implemented with multiplier that receives the corrected output Y' and a constant (either 1 or 0.7071).

The primary de-mapper performs the complement of the primary mapper. W and W' are related by alpha:

$$W'=W^{\alpha}=W^{0.5}$$

substituting for W using the primary mapping equation:

$$W'=(4^{-m}*X)^{0.5}=2^{-m}*X^{0.5}$$

since $X'=X^{\alpha}=X^{0.5}$ $$W'=2^{-m}*X'$$

Thus the primary de-mapper can be implemented as a shifter that shifts the intermediate output X' by m bits to the right.

Figure 8:
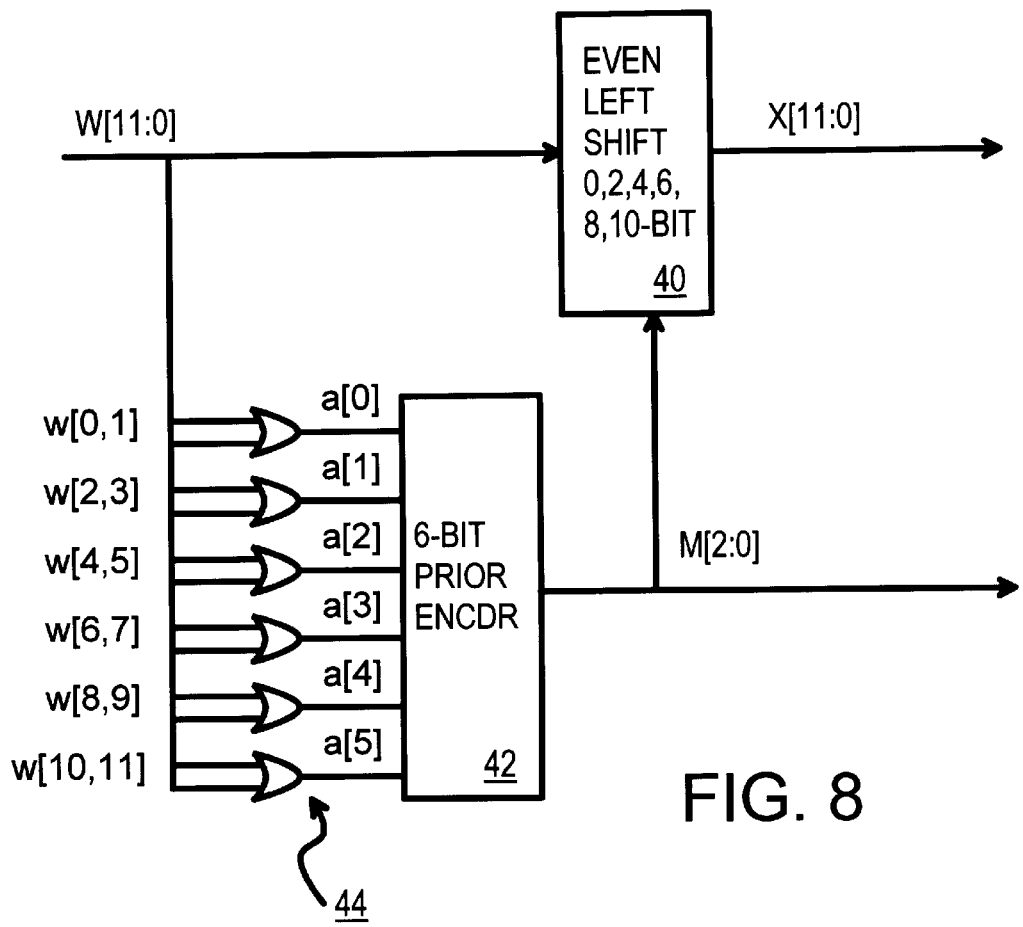
FIG. 8 is a block diagram of an implementation of primary mapping for a gamma corrector with 7 primary segments and 2 second-level segments.

Block Diagram for 7:2 Segment Example—FIG. 8

FIG. 8 is a block diagram of an implementation of primary mapping for a gamma corrector with 7 primary segments and 2 second-level segments. The input W is mapped to intermediate input W by the primary mapper (22 of FIG. 5). The primary priority encoder is implemented by OR gates 44 that feed their outputs to priority encoder 42. Priority encoder 42 is a 6-bit priority encoder that generates the primary shift signal M.

OR gates 44 each receive 2 of the 12 bits of input W. When the leading one in W is in either of the two leading bit positions W[11,10], then a[5] is high and priority encoder 42 outputs M as 0. This indicates that input W is in the largest primary segment X0. When the leading one in W is in either of the next two leading bit positions W[9,8], then a[4] is high and priority encoder 42 outputs M as 1. This indicates that input W is in the second largest primary segment X1. Likewise when the leading one of input W is in either of bit positions W[3,2] then a[1] is high and M is 4 indicating segment X4. When all 12 bits of W are zero, M is 6 for smallest segment X6.

Even-bit shifter 40 receives input W and left-shifts W by a number of bit-positions determined by shift signal M, producing intermediate input X. The number of bit-positions that W is shifted by is double the value of M. For example, when M is 1, W is shifted by 2 bit positions. When M is 4, W is shifted by 8 bit positions (multiply by $2^8$ or 256). The double-bit shifting causes the input to be shifted among the primary segments that have lengths that are four times larger than the prior segment.

For example, when W is in primary segment X4, M is 4. Even-bit shifter 40 shifts W by 8 bits. This scales X into the primary standard segment X0. Since segment X4 ranges from 1/1024 to 1/256, (See FIG. 7A) the shift multiplies inputs in this range by 256 to produce intermediate inputs X in the range of 1/4 to 1, which is the range of the primary standard segment X0.

Figure 4:
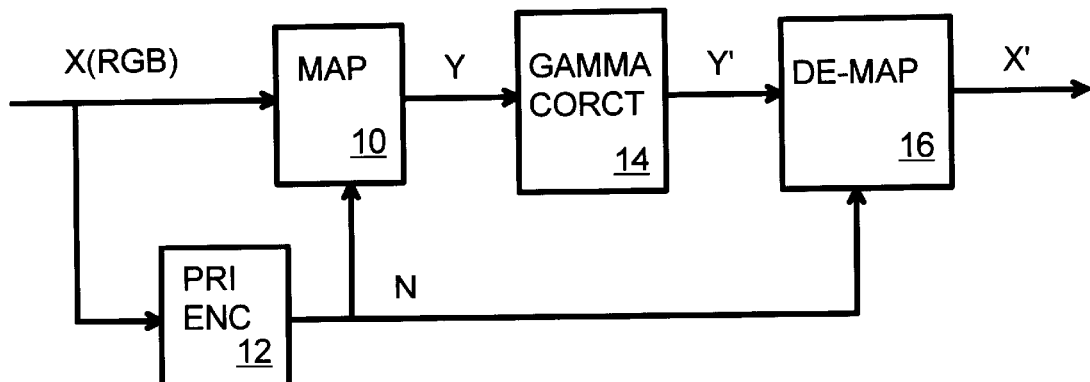
FIG. 4 is a diagram of gamma correction using segment mapping.

The primary mapper can be implemented by K/2 OR gates, where K is the number of bits in input W. The number of primary segments is K/2+1, and the primary priority encoder is a K/2-bit encoder with K/2+1 states for shift signal M. In the example above with a 12-bit input W, K is 12. There are 12/2 or 6 OR gates, a 6-bit priority encoder, and 7 primary segments. The primary priority encoder and shifter are much simpler than in the prior art since the number of bit-positions is cut in half (K/2 rather than K). In this example, a 6-bit primary priority encoder is used rather than a 12-bit priority encoder as in the prior art of FIGS. 2–4.

The second-level mapper (not shown) is much simpler, since there are only 2 second-level segments. N can be either 0 or 1. The second priority encoder can be a few simple gates, and the second-level shifter either shifts by 0 or 1 bit positions. Even when the simple second-level shift and encoder are included, the amount of logic required is much less than for the prior art.

Figure 9:
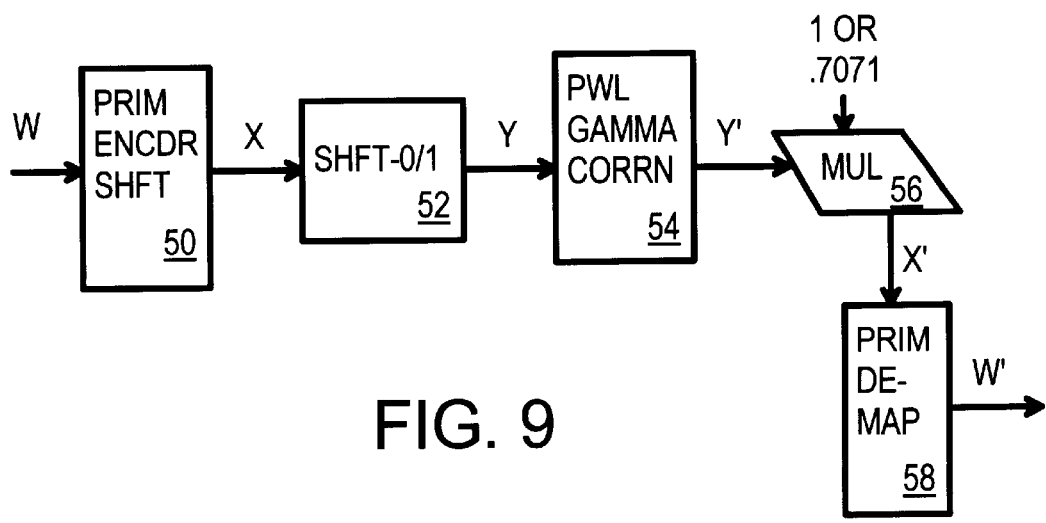
FIG. 9 is a block diagram for the gamma correction system with 7 primary segments and 2 second-level segments.

FIG. 9 is a block diagram for the gamma correction system with 7 primary segments and 2 second-level segments. The 12-bit input W is mapped to intermediate input X by primary mapper 50, using the priority encoder and shifter shown in FIG. 8. Second-level mapper 52 is a simple shifter that left-shifts X by one bit position or zero bit positions. The second shift signal N can be simply the leading bit of X, so no actual second priority encoder is needed.

The final output Y from second-level mapper 52 is applied to gamma corrector 54. A linear interpolator is used to generate the corrected output Y' from the final input Y. Linear interpolation can be performed in convention ways, such as with a dedicated multiplier and adder, or a programmable digital-signal processor (DSP).

The second-level de-mapper is also quite simple since there are only 2 second-level segments. Multiplier 56 performs the function of the second-level de-mapper. Multiplier 56 either passes the final output Y' through to intermediate output X', or multiplies Y' by the constant 0.7071 to generate X'. The multiplier can either multiply Y' by 1.00 or bypass Y' around the multiplier when the second segment is the standard second segment and no multiply is needed for de-mapping.

The intermediate output X' from multiplier 56 is then de-mapped by primary de-mapper 58 to generate the final output W'. Primary de-mapper 58 performs a right-shift by M bits to re-map the intermediate output from the primary standard segment to the actual primary-level segment. Note that while the primary mapper shifts by 2M bits, the primary de-mapper shifts by M bits. This occurs because a is 0.5.

Figures 10A, 10B, 11A, 11B:
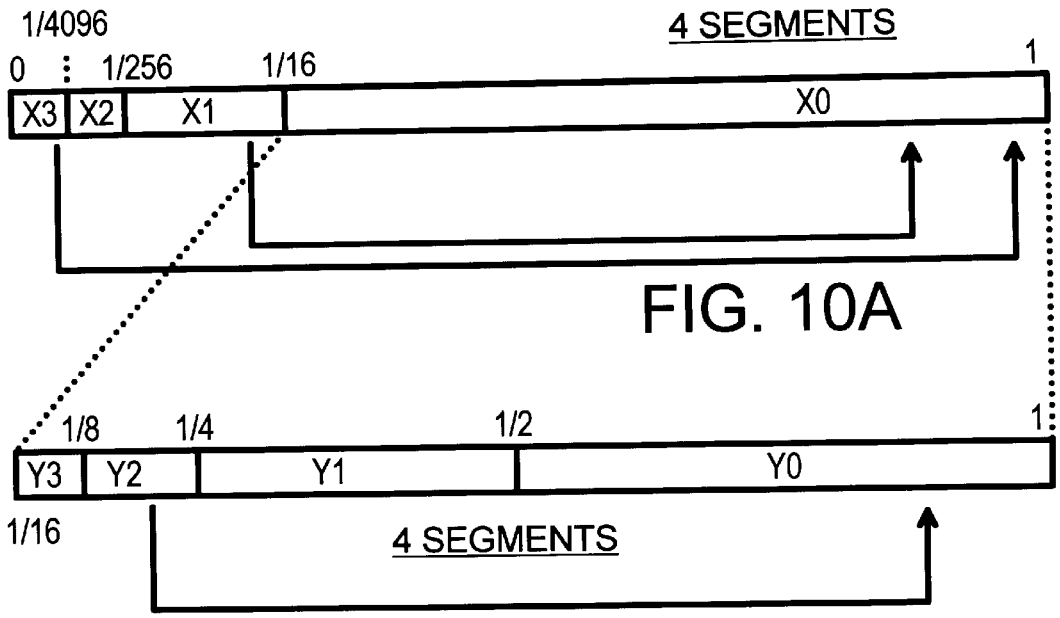
FIGS. 10A, 10B highlight another embodiment with 4 segments in each of two levels of segment mappings for a gamma-correction function.
FIGS. 11A, 11B are tables of the primary-level and second-level segments for the 4:4 segment embodiment.

4:4 Segment Example—FIGS. 10A, B

FIGS. 10A, 10B highlight another embodiment with 4 segments in each of two levels of segment mappings for a gamma-correction function. In this embodiment, the primary level has 4 segments X0–X3 and the second level has 4 segments Y0–Y3.

In FIG. 10A, the primary mapping divides the full normalized input range of 0 to 1.0 into 4 primary segments. These primary segments are ratio-metrically related by the constant a=16. The primary standard segment X0 is the largest segment, while successive segments X1 to X3 are each one-sixteenth (1/16) the width of the prior segment. Primary standard segment X0 includes input value from 1/16 to 1, a width of 15/16, while next segment X1 includes inputs from 1/256 to 1/16, a width of 15/256. The following segment X2 ranges from 1/4096 to 1/256 a width of only 15/4094. The smallest segment X3 is from 0 to 1/4096. See also the table of FIG. 11A.

Any input in the lower primary segments X1 to X3 are mapped to primary standard segment X0 by the primary-level of mapping. The intermediate input X is within the range of primary standard segment X0, from 1/16 to 1. These values are sent to the second-level mapper.

Figure 10B shows the secondary-level segments. The intermediate input X values are within the input range of the primary standard segment, from 1/16 to 1. This primary standard segment is further divided into 4 segments by the second-level mapping. In the second-level of mapping, each successive segment is one-half the width of the previous segment (b=2). Standard segment Y0 has intermediate inputs from 1/2 to 1, while smaller segment Y1 has inputs from 1/4 to 1/2. Segment Y2 has inputs from 1/8 to 1/4, while segment Y3 has inputs from 1/16 to 1/8. Since primary standard segment X0 ends at 1/16, additional second-level segments are not needed as the intermediate input value X cannot be less than 1/16.

Any input in smaller segments Y1, Y2, Y3 is mapped into standard segment Y0 by the second mapper. Standard segment Y0 is the segment that is gamma corrected to produce corrected output Y'.

FIG. 11A is a table of the primary-level segments. A total of 4 primary segments X0 to X3 are mapped for a 12-bit input W. The primary-level encoder encodes these segments by finding the leading one in input W. The ranges of each primary segment as shown in the table.

FIG. 11B is a table of the second-level segments. Four segments are in the second level, segments Y0 to Y3.

Four segments are mapped by the primary level and four more segments for the second level. This is a total of 4+4 or 8 segments. A 4-level priority encoder is used in each of the primary and secondary levels. Note that the precision of the primary level is still 1/4096, the range of the smallest segment. This same precision required a 13-level priority encoder in the prior art of FIGS. 2, 3. A reduction in logic from 13 levels to 8 levels is achieved.

Mapping/De-Mapping for 4:4 Example

If the value of gamma is assumed to be 4/3 or 1.33, then alpha a is 0.75. The designer selected ratio constants a=16 and b=2. The primary mapping follows the equation:

$$X = a^m * W = 16^m * W$$

This equation for the primary mapping can be implemented by a shifter that shifts by a multiple of four bit-positions (0, 4, 8, 12).

The secondary mapping is:

$$Y = b^n * X = 2^n * X$$

Since there are 4 secondary segments in this example, n can be 0, 1, 2, or 3. A 3-bit priority encoder and a shifter that shifts by 0, 1, 2, or 3 bit positions can implement the second-level mapper.

The second de-mapper passes Y' through to X' when n=0. When n=1, the complement of the secondary mapping equation is used for de-mapping:

$$X' = (1/b)^{0.75} * Y' = 0.5^{0.75} * Y' = 0.5946 * Y'$$

When n=2, the complement equation is:

$$X' = (1/b)^{0.75*n} * Y' = 0.5^{1.5} * Y' = 0.3536 * Y'$$

When n=3, the complement equation is:

$$X' = (1/b)^{0.75*n} * Y' = 0.5^{2.25} * Y' = 0.2102 * Y'$$

In general, the second-level de-mapper implements the equation:

$$X' = (1/b)^{\alpha * n} * Y'$$

The second de-mapping can be implemented with multiplier that receives the corrected output Y' and selects one of four constants (either 1, 0.5946, 0.3536, or 0.2102) depending on second shift signal N.

The primary de-mapper performs the complement of the primary mapper. W and W' are related by alpha:

$$W'=W^{\alpha}=W^{0.75}$$

substituting for W using the primary mapping equation:

$$W'=(a^{-m}*X)^{0.75}=(16^{-m}*X)^{0.75}=2^{-3m}*X^{0.75}$$

since $X'=X\alpha=X^{0.75}$ $$W'=2^{-3m}*X'$$

Thus the primary de-mapper can be implemented as a shifter that shifts the intermediate output X' by 3 m bits to the right.

In general, the primary-level de-mapper implements the equation:

$$W'=(1/a)^{a^{*}m}*X'=a^{-m\alpha}*X'$$

For this embodiment, K=12 bits, and a K/4-bit (3-bit) encoder can be used for implementing the primary encoder with K/4 (3) OR gates. The primary shifter shifts by 4M bits. The second-level encoder is also a K/4-bit priority encoder with a second shifter implemented by a 3-bit shifter. The primary de-mapper shifts by 3M bits while the second-level de-mapper is implemented by a multiplier that selects from among 4 constants.

ADVANTAGES OF THE INVENTION

The gamma corrector system uses multiple levels of segment mapping. The cost of the gamma correction system can be reduced by reducing the amount of logic required for a large multi-bit priority encoder. The number of constants that must be stored is reduced. The precision from a large number of segments is still achieved, but with a lower logic burden. High precision while using a small priority encoder is possible. An efficient structure for a gamma correction apparatus uses multiple levels of segment mapping.

The amount of logic can be reduced for a segment-mapped gamma corrector by using two levels of mapping. Although it would seem that using 2 levels of mapping and de-mapping would increase hardware requirements, since 5 stages or blocks rather than 3 blocks are needed, some choices for these levels can actually reduce hardware requirements.

Proper choices for nesting of segment mapping reduces the priority encoding necessary while maintaining high precision. The precision of 13 segments is achieved using two levels of mapping each with 4 segments per level. Two 4-bit priority encoders are needed rather than one larger 13-bit priority encoder. The amount of logic is reduced by more than 50%. The number of pre-defined constants that must be stored is also reduced by more than 80%.

ALTERNATE EMBODIMENTS

Several other embodiments are contemplated by the inventor. For example the logic may be implemented in a wide variety of ways. Standard components such as macro or library cells may be used, or a logic-synthesis tool that generates the actual logic gates may be used with the functional logic equations as inputs.

Programmable devices or blocks may be used. The invention may be integrated as part of a much larger system, such as a digital camera controller integrated circuit.

The multi-level scheme may be applied to a wide variety of functions other than the gamma function, such as power functions. The invention may also be used to calculate root-mean-square (RMS) and square root functions, which can be thought of as power functions with a negative exponent. The segment lengths do not have to be the same in a level, but could be varied multiples of each other. The gamma correction function can be applied to the Y component of a YUV pixel, or to each of the R, G, B components of a RGB pixel.

The various values can be encoded into signals in a variety of ways other than simple binary encoding. Encryption may also be used. Pipelining can be added by inserting staging registers at various points in the system. For example, the mapping and de-mapping can be pipelined. The priority encoder outputs can be latched and used in a later pipeline stage by the de-mappers.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A multi-level segment-mapping function generator comprising:

an input having an input value within an input range, the input range being divided into a plurality of first-level segments of varying width including a standard first-level segment;

a first-level mapper, receiving the input value, for scaling the input value to an intermediate input value within a range of the standard first-level segment, the first-level mapper outputting the intermediate input value to an intermediate input;

wherein the intermediate input value output by the first-level mapper is within a second input range equal to the range of the standard first-level segment, the range of the standard first-level segment being divided into a plurality of second-level segments of varying width, the plurality of second-level segments including a standard second-level segment;

a second-level mapper, receiving the intermediate input from the first-level mapper, for scaling the intermediate input value to generate a final input having a final input value, the final input value being within a range of the standard second-level segment;

a function generator, receiving the final input from the second-level mapper, for generating a result of a pre-determined function from the final input value;

a second-level de-mapper, receiving the result from the function generator, for adjusting the result from the function generator to an intermediate result, the intermediate result being a result of the pre-determined function for the intermediate input value; and a first-level de-mapper, receiving the intermediate result from the second-level de-mapper, for adjusting the intermediate result from the second-level de-mapper to a final result, the final result being a result of the pre-determined function for the input value, whereby the final result can be generated for any input value within the input range using the function generator that generates results only within the standard second-level segment.

2. The multi-level segment-mapping function generator of claim 1 wherein the plurality of first-level segments are non-overlapping and ratio-metrically related wherein each smaller first-level segment is 1/a the input width of a next larger first-level segment, wherein a is a positive integer representing a first ratio;

wherein the standard first-level segment is a largest of the plurality of first-level segments;

wherein the plurality of second-level segments are non-overlapping and ratio-metrically related wherein each smaller second-level segment is 1/b the input width of a next larger second-level segment, wherein b is a positive integer representing a second ratio;

wherein the standard second-level segment is a largest of the plurality of second-level segments, whereby segments are ratios of larger segments in a level.

3. The multi-level segment-mapping function generator of claim 2 wherein a is not equal to b, whereby each level has segments with different ratios of segment widths.

4. The multi-level segment-mapping function generator of claim 3 wherein the function generator is a linear interpolator generating the result by multiplying the final input by a slope of a line and adding a constant, whereby the pre-determined function is approximated by a line within the standard second-level segment.

5. The multi-level segment-mapping function generator of claim 4 wherein the first-level mapper comprises:

a first priority encoder, receiving the input, for detecting a leading significant bit in multiple bits in the input that represent the input value, the first priority encoder generating a first shift signal determined by a location of the leading significant bit within the input value;

a first shifter, receiving the input, for shifting the input value by a shift signal determined by the first shift signal to generate the intermediate input value, whereby the first-level mapper shifts the input value.

6. The multi-level segment-mapping function generator of claim 5 wherein the second-level mapper comprises:

a second priority encoder, receiving the intermediate input, for detecting a leading significant bit in multiple bits in the intermediate input that represent the intermediate input value, the second priority encoder generating a second shift signal determined by a location of the leading significant bit within the intermediate input value;

a second shifter, receiving the intermediate input, for shifting the intermediate input value by a second shift signal determined by the second shift signal to generate the final input value, whereby the second-level mapper shifts the intermediate input value.

7. The multi-level segment-mapping function generator of claim 6 wherein the input value has K binary bits, wherein a smallest of the plurality of first-level segments has a range of $1/2^K$ of the input range;

wherein a total number of segments in the plurality of first-level segments is N1;

wherein a total number of segments in the plurality of second-level segments is N2;

wherein N1+N2 is less than K;

whereby a precision of the function generator is $1/2^K$ of the input range but a total number of segments is less than K.

8. The multi-level segment-mapping function generator of claim 6 wherein the first-level de-mapper comprises:

a reverse shifter, receiving the intermediate result from the second-level de-mapper, for shifting the intermediate result by a number of bit-positions to generate the final result;

wherein the number of bit-positions is determined by the first shift signal from the first priority encoder;

wherein a full multiplier for multiplying the intermediate result by an arbitrary constant is not required;

wherein the reverse shifter shifts the intermediate result in an opposite direction to a direction that the first shifter shifts the input value.

9. The multi-level segment-mapping function generator of claim 8 wherein the second-level de-mapper comprises:

a constant multiplier, receiving the result from the function generator, for multiplying the result by a constant to generate the intermediate result;

wherein the constant is a function of the second shift signal from the second priority encoder.

10. The multi-level segment-mapping function generator of claim 9 wherein the predetermined function is a power function wherein the final result W' is related to the input value W by an equation:

$$W'=W^\alpha$$

where $\alpha$ is a positive constant.

11. The multi-level segment-mapping function generator of claim 10 wherein $\alpha$ is a reciprocal of a gamma-correction constant for correcting a light output of a pixel to a driving voltage of a display.

12. The multi-level segment-mapping function generator of claim 11 wherein the first-level de-mapper implements an equation:

$$W'=(1/a)^{\alpha*m}*X'$$

wherein W' is the final result, X' is the intermediate result, m is the first shift signal, and a is the first ratio.

13. The multi-level segment-mapping function generator of claim 12 wherein the second-level de-mapper implements an equation:

$$X'=(1/b)^{\alpha*n}*Y'$$

wherein X' is the intermediate result, Y' is the result from the function generator, n is the second shift signal, and b is the second ratio.

14. A method for gamma correcting a pixel comprising:

receiving an input value representing a brightness of a pixel, the input value being within an input range divided into primary segments that include a standard primary segment;

determining an original segment that contains the input value, the original segment being one of the primary segments identified by a first encoded signal;

shifting the input value to an intermediate input value, the intermediate input value being within the standard primary segment;

determining an intermediate second segment that contains the intermediate input value, the intermediate second segment being one of a plurality of second segments, wherein the standard primary segment is divided into the plurality of second segments;

shifting the intermediate input value to a final input value, the final input value being within a standard segment in the plurality of second segments;

generating a function result from the final input value, the function result being a gamma correction of the final input value;

adjusting the function result to generate an intermediate result, the intermediate result being the gamma correction of the intermediate input value; and adjusting the intermediate result to generate a final result, the final result being the gamma correction of the input value, whereby two levels of segment mapping are performed before gamma correction.

15. The method of claim 14 wherein adjusting the intermediate result to generate a final result comprises:

right-shifting the intermediate result to generate the final result, whereby a multiply by an arbitrary constant that is not a power of 2 is avoided when adjusting the intermediate result to generate a final result.

16. The method of claim 15 wherein shifting the input value to an intermediate input value comprises:

left-shifting by a multiple of M bits, where M is a location of a most-significant bit in the input value, whereby the input value is first shifted by a multiple of M bits.

17. The method of claim 16 wherein the input value represents a Y luminosity value of a pixel in a YUV format.

18. The method of claim 16 wherein shifting the intermediate input value to a final input value comprises left-shifting the intermediate input value by a multiple of N bits, where N is a second shift amount determined by a location of a most-significant bit in the intermediate input value;

wherein adjusting the intermediate result to generate a final result comprises:

multiplying the intermediate result by a constant, the constant selected from among a plurality of constants by the second shift amount N.

19. A power-function system comprising:

input means for receiving an input value, the input value being within an input range divided into primary segments that include a standard primary segment;

first priority means for determining an original segment that contains the input value, the original segment being one of the primary segments identified by a first encoded signal, first shift means, responsive to the first priority means, for shifting the input value to an intermediate input value, the intermediate input value being within the standard primary segment;

second priority means, receiving the intermediate input value from the first shift means, for determining an intermediate second segment that contains the intermediate input value, the intermediate second segment being one of a plurality of second segments, wherein the standard primary segment is divided into the plurality of second segments;

second shift means, responsive to the second priority means, for shifting the intermediate input value to a final input value, the final input value being within a standard segment in the plurality of second segments;

function means, receiving the final input value, for generating a function result from the final input value, the function result being a pre-defined function of the final input value;

second de-map means, responsive to the second priority means, for adjusting the function result to generate an intermediate result, the intermediate result being the pre-defined function of the intermediate input value; and first de-map means, responsive to the first priority means, for adjusting the intermediate result to generate a final result, the final result being the pre-defined function of the input value, whereby two levels of segment mapping are performed before the pre-defined function.

20. The power-function system of claim 19 wherein the first de-map means comprises:

shift means for right-shifting the intermediate result to generate the final result, whereby a multiply by an arbitrary constant that is not a power of 2 is avoided when adjusting the intermediate result to generate a final result.

* * * * *